United States Patent
Koh et al.

(10) Patent No.: US 9,501,394 B2
(45) Date of Patent: Nov. 22, 2016

(54) METHOD FOR SHARING REFERENCE DATA AMONG APPLICATION PROGRAMS EXECUTED BY A PLURALITY OF VIRTUAL MACHINES AND REFERENCE DATA MANAGEMENT APPARATUS AND SYSTEM THEREOF

(71) Applicant: ELECTRONICS AND TELECOMMUNICATIONS RESEARCH INSTITUTE, Daejeon (KR)

(72) Inventors: Kwang-Won Koh, Daejeon (KR); Kang-Ho Kim, Daejeon (KR); Seung-Hyub Jeon, Anyang (KR); Seung-Jo Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/734,758

(22) Filed: Jun. 9, 2015

(65) Prior Publication Data

US 2015/0356003 A1 Dec. 10, 2015

(30) Foreign Application Priority Data

Jun. 9, 2014 (KR) .................. 10-2014-0069643

(51) Int. Cl.
*G06F 12/02* (2006.01)
*G06F 9/455* (2006.01)
*G06F 17/30* (2006.01)

(52) U.S. Cl.
CPC ......... *G06F 12/023* (2013.01); *G06F 9/45533* (2013.01); *G06F 9/45558* (2013.01); *G06F 17/30* (2013.01); *G06F 2009/45583* (2013.01); *G06F 2212/1044* (2013.01); *G06F 2212/151* (2013.01); *G06F 2212/657* (2013.01)

(58) Field of Classification Search
CPC ............. G06F 12/023; G06F 9/45533; G06F 9/45558; G06F 2212/1044; G06F 2212/151; G06F 2212/657; G06F 17/30; G06F 2009/45583
See application file for complete search history.

(56) References Cited

U.S. PATENT DOCUMENTS

| | | | | |
|---|---|---|---|---|
| 5,991,742 A * | 11/1999 | Tran | .................... | G06F 15/0266 700/14 |
| 8,311,964 B1 * | 11/2012 | Efstathopoulos | ..... | G06F 3/0608 706/45 |
| 9,189,165 B2 * | 11/2015 | Koh | ....................... | G06F 3/0631 711/170 |
| 2004/0015921 A1 * | 1/2004 | Daynes | ............... | G06F 9/45516 717/153 |
| 2009/0083756 A1 | 3/2009 | Kim et al. | | |
| 2011/0264841 A1 * | 10/2011 | Duimovich | ......... | G06F 9/44521 711/6 |
| 2016/0011809 A1 * | 1/2016 | Matsuzawa | ........... | G06F 3/0619 711/113 |

FOREIGN PATENT DOCUMENTS

| | | |
|---|---|---|
| KR | 10-0929852 B1 | 12/2009 |
| KR | 10-2012-0113584 A | 10/2012 |

OTHER PUBLICATIONS

Andrea Arcangeli et al., "Increasing memory density by using KSM", Proceedings of the Linux Symposium, Jul. 13-17, 2009, pp. 19-28.

* cited by examiner

*Primary Examiner* — Hiep Nguyen

(57) ABSTRACT

Apparatus, method and systems for managing reference data, which can prevent duplicated data loading of reference data and eliminate redundancy of I/O operations for loading of the same reference data required by different virtual machines present in the same physical node to reduce use memory and I/O through sharing virtual machine leveled memories, are provided.

13 Claims, 7 Drawing Sheets

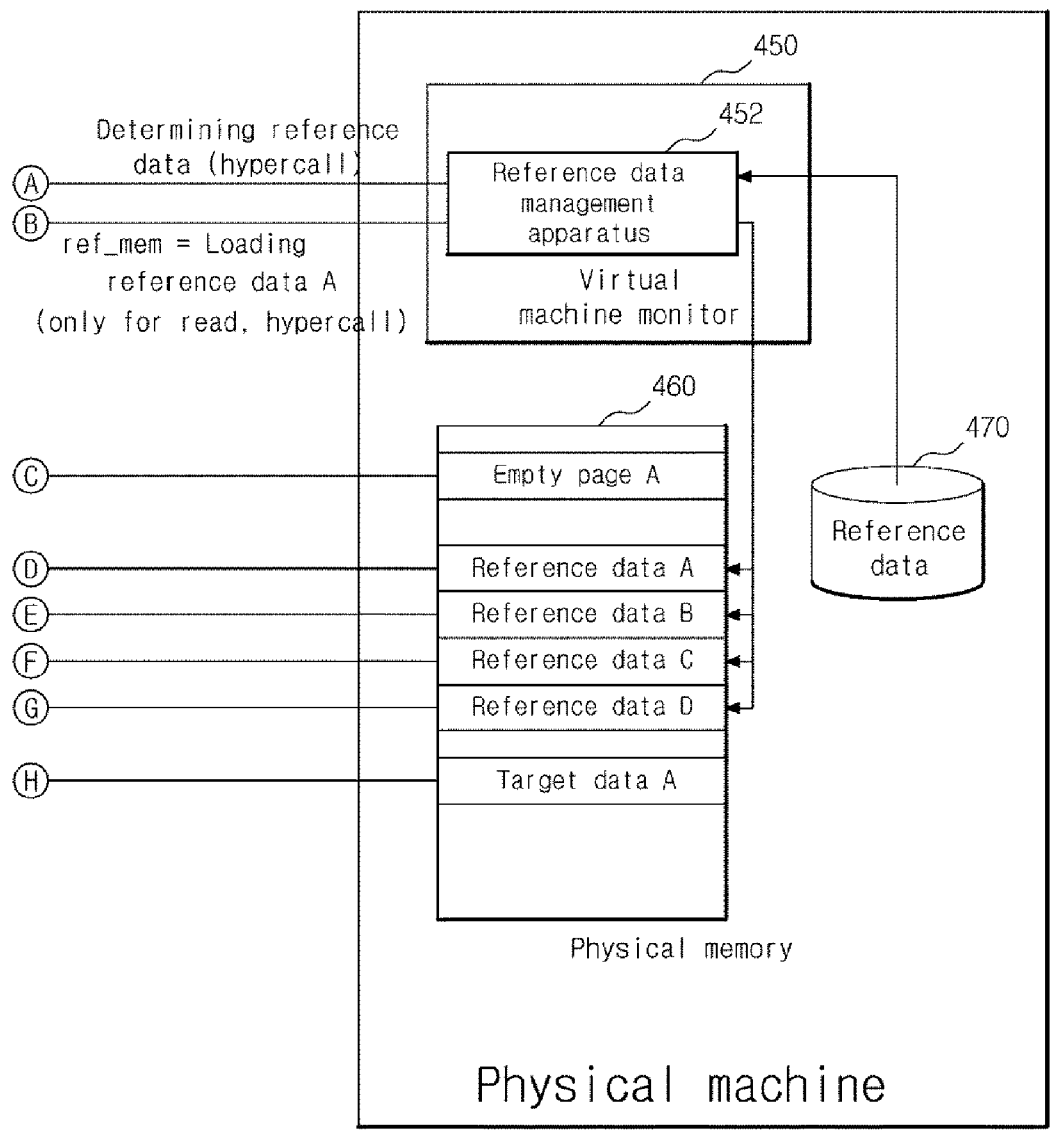

METHOD FOR SHARING REFERENCE DATA AMONG APPLICATION PROGRAMS EXECUTED BY A PLURALITY OF VIRTUAL MACHINES AND REFERENCE DATA MANAGEMENT APPARATUS AND SYSTEM THEREOF

CROSS REFERENCE TO RELATED APPLICATION

This application claims the benefit of Korean Patent Application No. 10-2014-0069643, filed on Jun. 9, 2014, entitled "Method for sharing reference data among application programs executed by a plurality of virtual machines and Reference data management apparatus and system therefor", the disclosure of which is incorporated by reference herein in its entirety.

BACKGROUND OF THE INVENTION

1. Technical Field

The disclosed embodiments relate generally to reference data management having high reusability in cloud computing environments and more particularly to a method, apparatus and system for sharing the same reference data among a plurality of application programs executed by a plurality of virtual machines.

2. Description of the Related Art

When more than one virtual machine operates in physical machines in cloud computing environment, application programs in different virtual machines which perform calculations based on the same reference data can be executed. Particularly, a size of reference data required by biological information application programs is very large (e.g., from several hundreds of MBs to several tens of TBs) and such data also has high reusability according to application algorithm in analysis.

In addition, when computing nodes refer to the same reference data at the same time in cloud computing environments, the same data can be duplicated in the memory of each node and each computing node causes disk input/output (I/O) in order to load reference data, which results in inefficiency of a processor.

A method for comparing data stored in a memory to avoid duplicated data has been used in order to resolve these problems. However, it shows problem of high memory requirements when the system is not stabilized.

SUMMARY OF THE INVENTION

Apparatus, method and systems are disclosed for managing reference data, which can prevent duplicated data loading of reference data and eliminate redundancy of I/O operations for loading of the same reference data which is required by different virtual machines present in the same physical node to reduce use memory and I/O through sharing virtual machine leveled memories.

In some embodiments, there is provided a computer-implemented method for sharing reference data between a plurality of application programs executed by a plurality of virtual machines. The method may include allocating an empty page of a physical memory in response to a memory allocation request for a reference data file from one application program; determining whether the reference data file has been already loaded in the physical memory by another application program in response to an open request for the reference data file from the application program; and sharing, when the reference data file has already been loaded in the physical memory, the reference data file between the one application program and the another application program by mapping an address of the physical memory in which the reference data file has been loaded to a virtual machine memory address in which the empty page is mapped, in response to a read request of the reference data file from the application program.

In an embodiment, the method may further include releasing the allocation of the empty page, after mapping to the virtual machine memory address.

In an embodiment, each of the one application program and the another application program may be executed by a different virtual machine present in the same physical machine.

In another embodiment, each of the one application program and the another application program may be executed by the same virtual machine present in the same physical machine.

In an embodiment, the open request and the read request for the reference data file from the application program may be requested to a virtual machine monitor through a hypercall.

In an embodiment, the method may further include loading a target data file in the empty page of the physical memory in response to a read request of the target data file related to the reference data file from the application program, wherein the read request for the target data file may be requested through a system call which is provided by the operating system.

According to an embodiment, there is provided an apparatus for managing reference data referred by a plurality of application programs executed by a plurality of virtual machines present in the same physical machine. The apparatus may include a storage device manager configured to manage an address of a storage device in which reference data is stored; a loaded memory manager configured to manage an address f a physical memory in which the reference data is loaded; a mapping relation manager configured to manage mapping relation information between the physical memory address and the virtual machine memory address in which the reference data is stored; and a reference data request handler configured to map an address of the physical memory in which the reference data file has been already loaded to a virtual machine memory address, in which an empty page allocated to an application program is mapped, in response to a read request for the reference data file which has been already loaded in the physical memory from the application program.

In an embodiment, the apparatus may be embedded in a virtual machine monitor.

In an embodiment, the read request of the reference data file from an application program may be requested through a reference data interface in a virtual machine operating system.

In an embodiment, when an open request is received before the read request of the reference data file from the application program, the reference data request handler determines whether the reference data file requested to be opened has been already loaded in the physical memory through the loaded memory manager.

According to an embodiment, there is provided a computing system which executes a plurality of application programs by using a plurality of virtual machines present in the same physical machine. The computing system may include a reference data management device included in a virtual machine monitor within the physical machine, the device being configured to manage reference data files referred by the plurality of application programs; and a reference data interface included in an operating system of each virtual machine, the interface being configured to receive a request for a reference data file from the application programs and transmit the received request to the reference data management device. In an embodiment, the reference data interface provides functions which are needed for the application program to request for opening, reading and writing the reference data file.

According to the present invention, it can increase amount of computations per unit time through dualistic management of reference data and target data and sharing of the reference data. It also prevents loading the same reference data in a memory doubly for more than one application program and provides the same effect as when each of a plurality of application programs directly loads and uses one reference data.

According to at least certain embodiments, it allows providing much more virtual machines by using the same physical machine when an application is performed based on big reference data in a cloud computing environment and processing effectively for big data by reducing I/O related to reference data access.

They can also allow cost savings related to cloud computing resources with rapid growing of adoption of cloud computing environments in order to perform applications using reference data which requires high-density memory such as bioinformatics.

BRIEF DESCRIPTION OF DRAWING

FIGS. 4A and 4B illustrate a memory allocation process when reference data management according to an embodiment of the present invention is applied.

DESCRIPTION OF THE EXEMPLARY EMBODIMENTS

The present invention will be described with reference to particular embodiments, it is however to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted.

The terms used in the description are intended to describe certain embodiments only, and shall by no means restrict the present invention. Unless clearly used otherwise, expressions in the singular number include a plural meaning.

In addition, "module", "unit", "interface" and the like among the terms used in the description mean computer-related objects such as hardware, software and a combination thereof.

Figure 1:
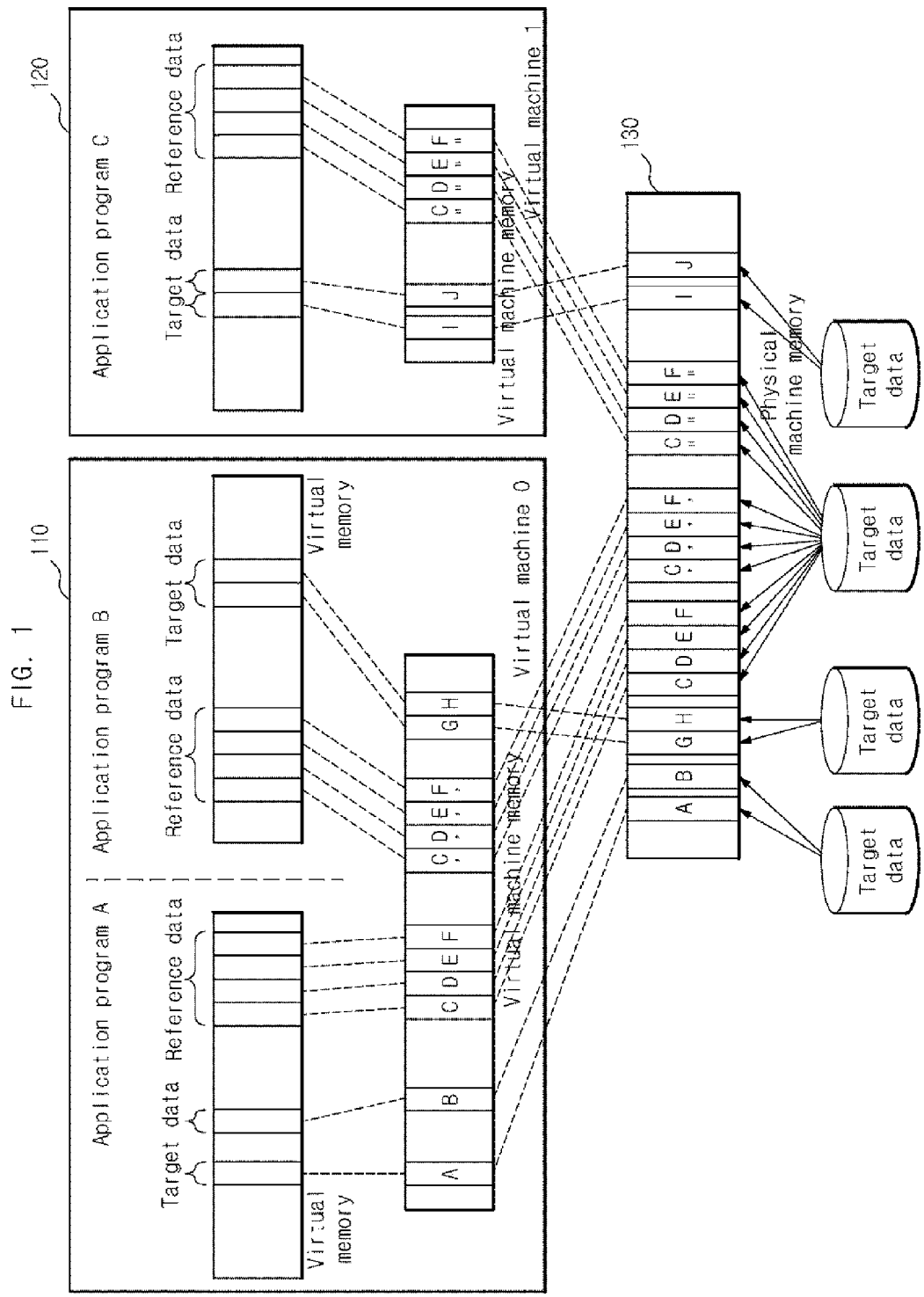
FIG. 1 illustrates memory mapping relations in a conventional virtualization system, which does not share reference data.

FIG. 1 illustrates memory mapping relations in a conventional virtualization system which does not share reference data.

As shown in FIG. 1, it is assumed that virtual machine 0(110) and a virtual machine 1(120) operate in one virtualized physical machine. Application program A and application program B are executed in virtual machine 0(110), while application program C is executed in the virtual machine 1(120). It is assumed that the application programs A, B and C upload the reference data and the target data in a physical machine memory 130 through the traditional mechanism such as a Linux file interface to process them.

In this case, each application program allocates and map additional memories (C', D', E', F', C'', D'', E'', F'') to virtual memories of each application in order to use the same reference data (C, D, E, F). As a result, duplicate data is loaded in the memory, resulting in inefficient use and additional 10 bandwidth.

Figure 2:
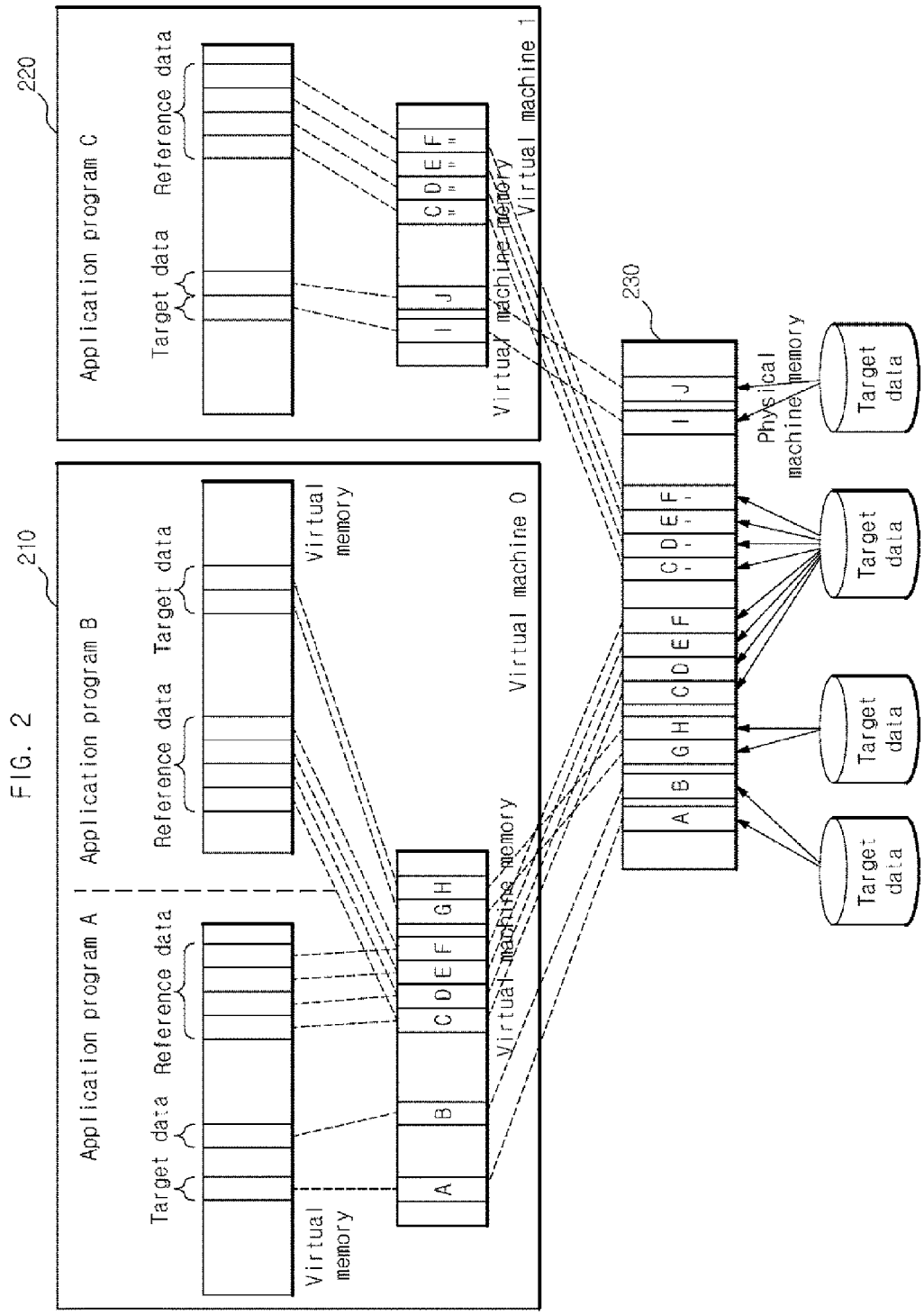
FIG. 2 illustrates memory mapping relations when reference data is shared in an operating system.

FIG. 2 illustrates memory mapping relations when reference data is shared in an operating system.

It is assumed that execution environments of the application programs A, B, C in FIG. 2 are identical to those in FIG. 1. When application programs A and B use the same reference data in virtual machine 0(210), an operating system maintains a single copy of the reference data. However, when application program C, which is executed in a virtual machine 1, 220, uses the same reference data, the duplicated data (C', D', E', F') should be present in a physical machine memory 230, which is used by both the virtual machine 0(210) and the virtual machine 1(220). Thus, even though the reference data (C', D', E', F') used by the application program C is identical to the reference data (C, D, E, F) used by the application programs A and B, overhead for an additional memory space is required and results in reduction of integration of the virtual machine. Furthermore, such identical data duplications can use more CPU cache resources.

Figure 3:
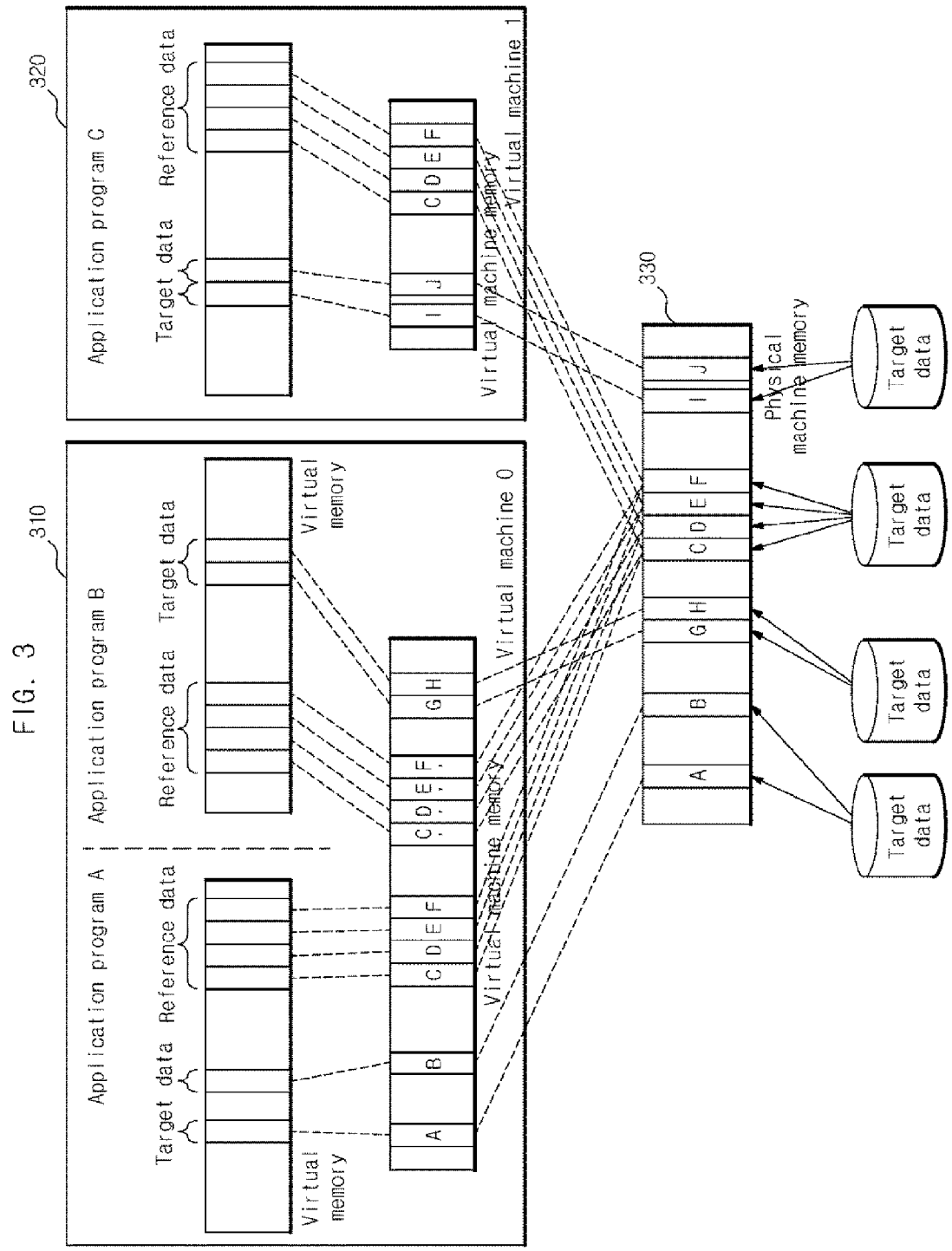
FIG. 3 illustrates memory mapping relations when reference data management according to an embodiment of the present invention is applied.

FIG. 3 illustrates memory mapping relations when reference data management according to one embodiment of the present invention is applied.

As shown in FIG. 3, when the application program A and the application program B, which use the same reference data, are executed in the virtual machine 0, each of the application programs A and B reads necessary reference data and target data from a storage (e.g., hard disk drive). The application program C resided in the virtual machine 1 reads reference data and target data. Here, according to an embodiment of the present invention, reference data is not duplicated in the entire system so that memory requirements and 10 bandwidth can be reduced.

Figure 4A:
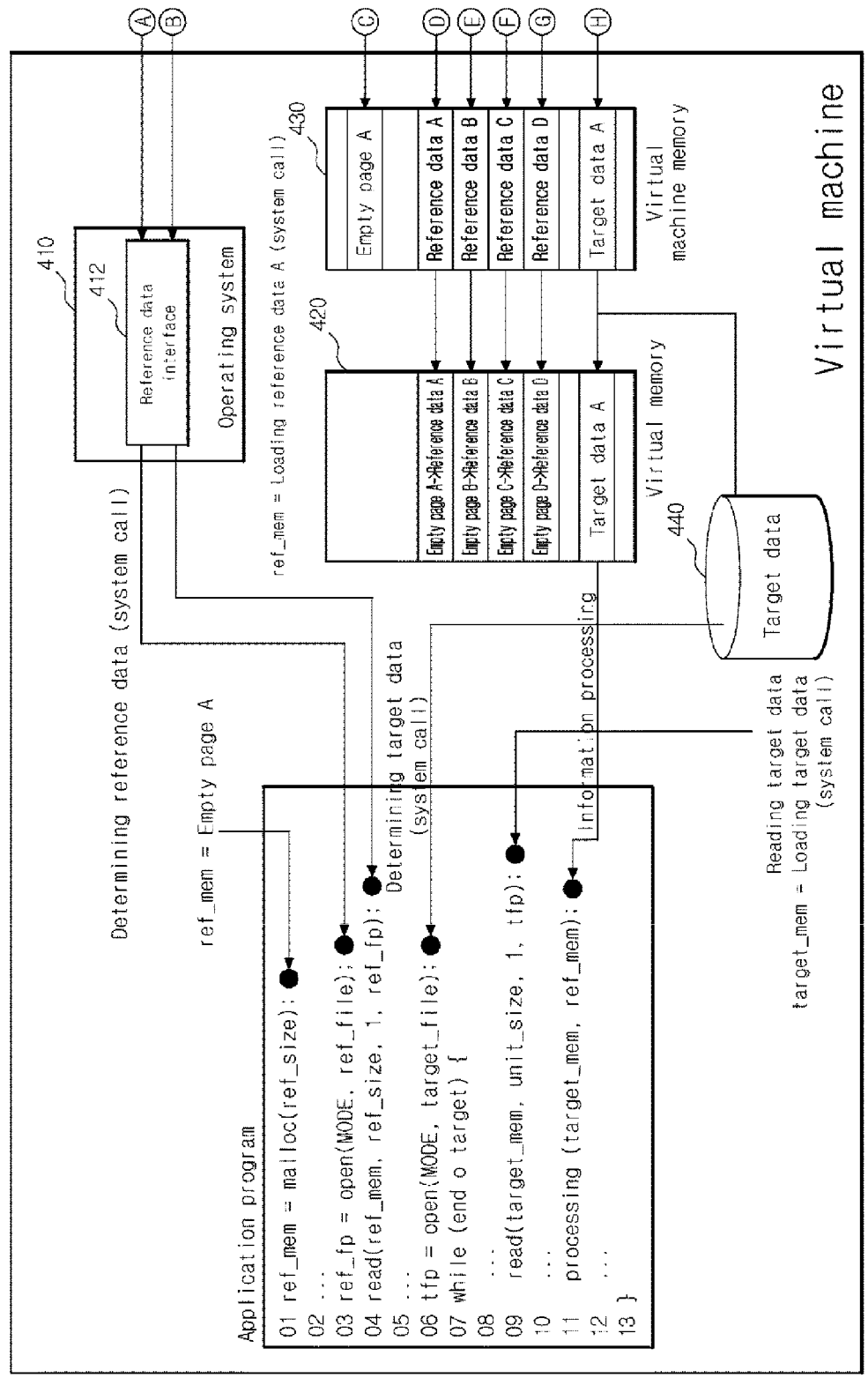

FIGS. 4A and 4B illustrate a memory allocation process when reference data management according to an embodiment of the present invention is applied.

In an embodiment, a reference data interface 412 may operate in an operating system 410 for reference data management and a reference data management apparatus 452 may operate in a virtual machine monitor 450.

When an application program processes reference data, the reference data interface 412 calls the reference data management apparatus 452 in the virtual machine monitor 450 through a hypercall. When a request function such as open( ), read( ), write( ) and the like provided in the reference data interface 412 is called by the application program, the reference data management apparatus 452 which is called performs the corresponding function.

The reference data management apparatus 452 may manage mapping relation information between the physical memory 460 and the virtual machine memory 430 in which the reference data is loaded. Detailed configuration of the reference data management apparatus 452 will be explained below with reference to FIG. 5.

As described above, FIG. 4 illustrates a memory allocation process when a plurality of virtual machines are present in one physical machine and an application program which is executed in one virtual machine uses the reference data which is identical to the reference data which has been already loaded by another application program, which is executed in the same virtual machine or a different virtual machine.

First, empty pages A-D are allocated in the physical memory 460 so that an application program can use the reference data (Code 01).

Then, an open function provided by the reference data interface 412 is called to open a reference data file.

In an embodiment, the open function provided by the reference data interface 412 calls to the reference data management apparatus 452 in the virtual machine monitor 450 through a hypercall.

When an application program calls a read function provided by the reference data interface 412 (Code 04), the reference data management apparatus 452 maps the pre-loaded physical addresses of the reference data file, which are addresses in the physical memory, to the addresses of the virtual machine memory 430 which is mapped to the empty page A allocated by using the Code 1 of the application program. The reference data A to the reference data D is mapped to the space of the virtual machine memory 430 which is mapped to the empty pages A-D. Allocation of the empty pages A-D is then released. According to Code 06 to Code 13 of the application program, a target data file related to the corresponding reference data file is opened to be loaded in the physical memory 460 and information processing is performed based on the pre-loaded reference data. According to the call of a read( ) function of the application program, the target data may be loaded from the target data DB 440 to the physical memory 460 to be mapped to the virtual machine memory 430 and the virtual memory 420.

In an embodiment, a desired function may be requested to the reference data management apparatus 452 of the virtual machine monitor 450 through a hypercall to use the reference data (Code 03, 04), and a desired function may be requested to the file system of the operating system through a system call which is provided from the operating system in the virtual machine to use target data.

According to the above-mentioned method, the memory in which the target data having low reusability is stored through the virtual machine operating system and the memory in which the reference data having high reusability is managed through the reference data management apparatus 452 in the virtual machine monitor 450 so that the memory can be used efficiently and requirement bandwidth required for input/output (I/O) of the reference data can be reduced.

Figure 5:
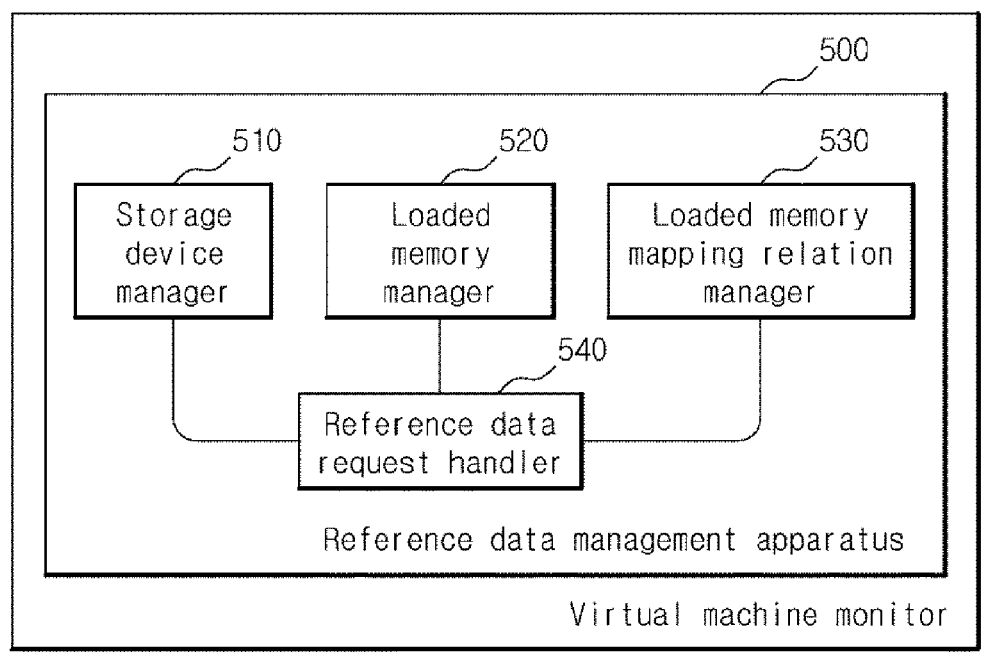
FIG. 5 is a block diagram illustrating the configuration of a reference data management apparatus according to an embodiment of the present invention.

FIG. 5 is a block diagram illustrating the configuration of a reference data management apparatus according to an embodiment of the present invention.

As shown in FIG. 5, a reference data management apparatus 500 is implemented on a virtual machine monitor and can process an open request, a read request, a write request and the like for the reference data file delivered through the reference data interface included in the operating system of the virtual machine.

In an embodiment, when an application program, which is executed in the virtual machine, calls any function of open ( ), read( ), write( ) function and the like provided by the reference data interface, a hypercall for the reference data management apparatus 500 on the virtual machine monitor is called.

The reference data management apparatus 500 may include a storage device manager 510, a loaded memory manager 520, a loaded memory mapping relation manager 530 and a reference data request handler 540.

The storage device manager 510 manages an address of a storage device in which the reference data is stored.

The loaded memory manager 520 manages an address of the physical memory in which the reference data has been loaded.

The loaded memory mapping relation manager 530 manages mapping relation information between the physical memory address, in which the reference data is stored, and the virtual machine memory address.

The reference data request handler 540 determines whether the reference data file which is called for the open request has been already loaded in the physical memory by referring to the loaded memory manager 420, when an application program transmits an open request for a reference data file through the reference data interface (that is, when an open( ) function provided by the reference data interface is called). Further, in response to a read request for the reference data file loaded in the physical memory (that is, when a read( ) function provided by the reference data interface is called), the reference data request handler 540 may map the physical memory address, in which the reference data file is loaded, to a virtual machine memory address, which is mapped to an empty page allocated in the application program, and let the loaded memory mapping relation manager 530 to store mapping relation between the physical memory address and the virtual machine memory address.

On the other hand, when the reference data file has not been loaded in the physical memory, the corresponding reference data file is read and loaded in the memory by using the storage device address of the reference data stored in the storage device manager 510 and the loaded memory address is stored by the loaded memory manager 520.

Figure 6:
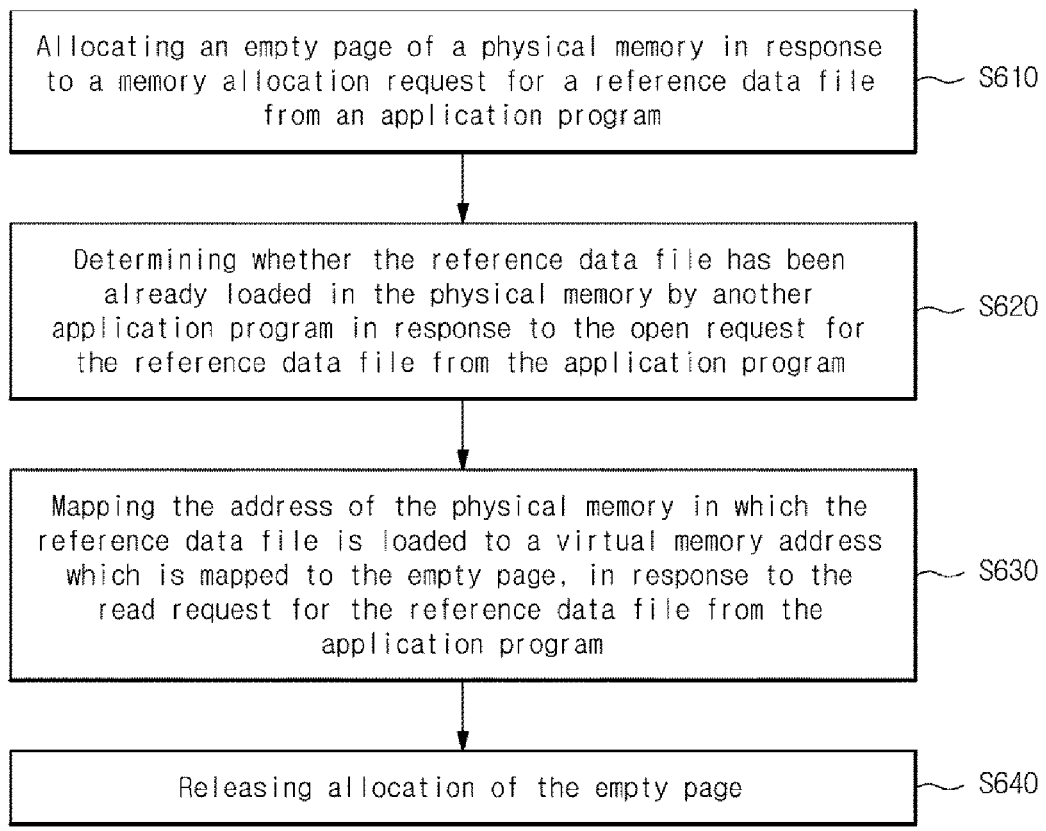
FIG. 6 is a flowchart illustrating a process for sharing reference data according to an embodiment of the present invention.

FIG. 6 is a flowchart illustrating a process for sharing reference data according to an embodiment of the present invention.

An empty page of a physical memory is allocated in response to a memory allocation request for a reference data file from an application program in Step 610.

It is determined whether the reference data file has been already loaded in the physical memory by another application program in response to the open request for the reference data file from the application program in Step 620.

In an embodiment, the another application program may be executed in the same virtual machine where the application program calling for the open request for the reference data file is executed, or in a different virtual machine.

When it is determined as that the reference data file has been already loaded in the physical memory by the another application program, the address of the physical memory in which the reference data file is loaded is mapped to a virtual memory address which is mapped to the empty page, in response to the read request for the reference data file from the application program in Step 630. By this, the reference data file can be shared between the application program and the another application program.

The allocated empty page is finally released in Step 640

In an embodiment, an open or a read request for a reference data file from an application program may be requested to a virtual machine monitor through a hypercall.

On the other hand, when a read request for a target data file related to the reference data file is requested from the application program, the method further includes loading the target data file in the empty page of the physical memory. Here, the read request for the target data file is requested through a system call provided by the virtual machine operating system.

According to the above embodiments, calculation amount per unit time can be increased through dualistic management of reference data and target data and sharing of the reference data.

Exemplary embodiments of the present invention may be implemented in a computer system, for example, a computer readable recording medium. The computer readable medium may include a program instruction, a data file and a data structure or a combination of one or more of these.

The program instructions recorded in the computer readable medium may be specially designed for the present invention or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMs), and flash memories. In addition, the above described medium may be a transmission medium such as light including a carrier wave transmitting a signal specifying a program instruction and a data structure, a metal line and a wave guide. The program instruction may include a machine code made by a compiler, and a high-level language executable by a computer through an interpreter.

The above described hardware device may be constructed to operate as one or more software modules to perform the operation of the present invention, and vice versa.

While it has been described with reference to particular embodiments, it is to be appreciated that various changes and modifications may be made by those skilled in the art without departing from the spirit and scope of the embodiment herein, as defined by the appended claims and their equivalents. Accordingly, examples described herein are only for explanation and there is no intention to limit the invention. The scope of the present invention should be interpreted by the following claims and it should be interpreted that all spirits equivalent to the following claims fall with the scope of the present invention.

What is claimed is:

1. A computer-implemented method for sharing reference data among a plurality of application programs executed by a plurality of virtual machines, the method comprising:
    allocating an empty page of a physical memory in response to a memory allocation request for a reference data file from one application program;
    determining whether the reference data file has been already loaded in the physical memory by another application program in response to an open request for the reference data file from the application program; and
    sharing, when the reference data file has already been loaded in the physical memory, the reference data file between the one application program and the another application program by mapping an address of the physical memory in which the reference data file has been loaded to a virtual machine memory address in which the empty page is mapped, in response to a read request of the reference data file from the application program.

2. The computer-implemented method for sharing reference data of claim 1, further comprising releasing the allocation of the empty page, after mapping to the virtual machine memory address.

3. The computer-implemented method for sharing reference data of claim 1, wherein each of the one application program and the another application program is executed by a different virtual machine present in the same physical machine.

4. The computer-implemented method for sharing reference data of claim 1, wherein each of the one application program and the another application program is executed by the same virtual machine present in the same physical machine.

5. The computer-implemented method for sharing reference data of claim 1, wherein the open request and the read request for the reference data file from the application program are requested to a virtual machine monitor through a hypercall.

6. The computer-implemented method for sharing reference data of claim 1, further comprising loading a target data file into the empty page of the physical memory in response to a read request of the target data file related to the reference data file from the one application program,
    wherein the read request for the target data file is requested through a system call provided by the operating system.

7. An apparatus for managing reference data referred by a plurality of application programs executed by a plurality of virtual machines present in the same physical machine, comprising:
    a storage device manager configured to manage an address of a storage device in which reference data is stored;
    a loaded memory manager configured to manage an address of a physical memory in which the reference data is loaded;
    a mapping relation manager configured to manage mapping relation information between the physical memory address and the virtual machine memory address in which the reference data is stored; and
    a reference data request handler configured to map an address of the physical memory in which the reference data file has been already loaded to a virtual machine memory address, in which an empty page allocated to an application program is mapped, in response to a read request for the reference data file which has been already loaded in the physical memory from the application program.

8. The apparatus of claim 7, wherein the reference data management apparatus is embedded in a virtual machine monitor.

9. The apparatus of claim 7, wherein the read request for the reference data file from the application program is requested through a reference data interface included in a virtual machine operating system.

10. The apparatus of claim 7, wherein, when an open request is received before the read request of the reference data file from the application program, the reference data request handler determines whether the reference data file requested to be opened has been already loaded in the physical memory through the loaded memory manager.

11. A computing system that executes a plurality of application programs using a plurality of virtual machines present in the same physical machine, the computing system comprising:
   a reference data management device included in a virtual machine monitor within the physical machine, the device being configured to manage reference data files referred by the plurality of application programs; and
   a reference data interface included in an operating system of each virtual machine, the interface being configured to receive a request for a reference data file from the application programs and transmit the received request to the reference data management device.

12. The computing system of claim 11, wherein the reference data interface provides functions which are needed for the application program to request for opening, reading and writing the reference data file.

13. The computing system of claim 11, wherein the reference data management device includes:

a storage device manager configured to manage an address of a storage device in which reference data is stored;

a loaded memory manager configured to manage an address of a physical memory in which the reference data is loaded;

a mapping relation manager configured to manage mapping relation information between the physical memory address and the virtual machine memory address in which the reference data is stored; and a reference data request handler configured to map an address of the physical memory in which the reference data file has been already loaded to a virtual machine memory address, in which an empty page allocated to an application program is mapped, in response to a read request for the reference data file which has been already loaded in the physical memory from the application program.

* * * * *